(12) United States Patent
Kroupa

(10) Patent No.: US 8,873,250 B2
(45) Date of Patent: Oct. 28, 2014

(54) ATTACHABLE EXTENDABLE AND RETRACTABLE EARPIECE CABLE ASSEMBLY FOR MOBILE COMMUNICATION AND SOUND DEVICES

(76) Inventor: Robert Kroupa, Chicago, IL (US)

(*) Notice: Subject to any disclaimer, the term of this patent is extended or adjusted under 35 U.S.C. 154(b) by 343 days.

(21) Appl. No.: 13/369,580

(22) Filed: Feb. 9, 2012

(65) Prior Publication Data

US 2012/0314351 A1  Dec. 13, 2012

Related U.S. Application Data

(63) Continuation of application No. 13/157,169, filed on Jun. 9, 2011, now abandoned.

(51) Int. Cl.
H05K 7/00 (2006.01)
B65H 75/44 (2006.01)
H02G 11/02 (2006.01)
H04R 1/10 (2006.01)

(52) U.S. Cl.
CPC .......... *H04R 1/1033* (2013.01); *B65H 75/4434* (2013.01); *B65H 2701/3919* (2013.01); *H02G 11/02* (2013.01)
USPC ...... 361/826; 361/679.01; 242/400; 381/384; 320/114

(58) Field of Classification Search
USPC .................... 361/679.01, 826; 206/223, 320; 381/384; 320/114
See application file for complete search history.

(56) References Cited

U.S. PATENT DOCUMENTS

| | | |
|---|---|---|
| 5,044,981 A | 9/1991 | Suffi |
| 5,253,292 A | 10/1993 | Fluder et al. |
| 5,664,868 A | 9/1997 | Montalbano |
| 6,170,775 B1 | 1/2001 | Kovacik et al. |
| 6,273,354 B1 | 8/2001 | Kovacik et al. |
| 6,616,080 B1 | 9/2003 | Edwards |
| 6,633,770 B1 | 10/2003 | Gitzinger et al. |
| 6,644,582 B1 | 11/2003 | Liao |
| D484,874 S | 1/2004 | Chang et al. |
| 6,701,159 B1 | 3/2004 | Powell |
| 6,712,304 B1 | 3/2004 | Taylor |
| 6,731,956 B2 | 5/2004 | Hanna et al. |
| 6,763,111 B2 | 7/2004 | Liao |
| 7,032,728 B2 | 4/2006 | Harcourt |
| 7,151,912 B1 | 12/2006 | Morrison |
| 7,257,422 B2 | 8/2007 | Loprete |
| 7,286,789 B2 | 10/2007 | Umezawa |

(Continued)

FOREIGN PATENT DOCUMENTS

DE  29918357  10/1999
GB  2316300  2/1998

*Primary Examiner* — Robert J Hoffberg
*Assistant Examiner* — Michael Matey
(74) *Attorney, Agent, or Firm* — Howard B. Rockman; Mercedes V. O'Connor

(57) ABSTRACT

An extendable and retractable earpiece or audio headset cable assembly for mobile electronic devices having an audio output port having a mount attached to a portion of the mobile communication or sound device, such as the battery access door or panel. An earpiece cable reel housing is removably connected to the mount, and the mount includes a flange having an outwardly extending rim. The reel housing includes a slot that receives and engages the rim of the flange to removably attach the reel housing to the mount. In another embodiment, the mount is integrally formed with the battery access door or panel. In a further embodiment, the reel housing is integrally formed with a protective casing that is attached to the mobile electronic device.

13 Claims, 4 Drawing Sheets

(56) References Cited

U.S. PATENT DOCUMENTS

| | | | |
|---|---|---|---|
| D565,291 S | 4/2008 | Brandenburg et al. | |
| D574,819 S | 8/2008 | Andre et al. | |
| D575,056 S | 8/2008 | Tan | |
| D581,151 S | 11/2008 | Aipa | |
| 7,478,776 B2 | 1/2009 | Salentine et al. | |
| D587,896 S | 3/2009 | Aipa | |
| 7,539,302 B2 | 5/2009 | Kulas | |
| 7,612,997 B1 | 11/2009 | Diebel et al. | |
| D606,751 S | 12/2009 | Andre et al. | |
| 7,648,027 B2 | 1/2010 | Lin et al. | |
| 7,699,198 B2 | 4/2010 | Sirichai et al. | |
| D621,822 S | 8/2010 | Richardson et al. | |
| D622,716 S | 8/2010 | Andre et al. | |
| 7,782,610 B2 | 8/2010 | Diebel et al. | |
| D624,910 S | 10/2010 | Richardson et al. | |
| 7,933,122 B2 | 4/2011 | Richardson et al. | |
| D644,636 S | 9/2011 | Richardson et al. | |
| D645,031 S | 9/2011 | Richardson et al. | |
| 8,016,107 B2 | 9/2011 | Emsky | |
| 8,204,561 B2 | 6/2012 | Mongan et al. | |
| 8,245,842 B2 | 8/2012 | Bau | |
| D667,823 S | 9/2012 | Merenda | |
| 8,367,235 B2 | 2/2013 | Huang | |
| 8,439,191 B1 | 5/2013 | Lu | |
| 8,457,701 B2 | 6/2013 | Diebel | |
| 8,485,404 B2 | 7/2013 | Monaco et al. | |
| 8,579,172 B2 | 11/2013 | Monaco et al. | |
| 2001/0035242 A1 | 11/2001 | Hughs et al. | |
| 2002/0126837 A1 | 9/2002 | Dowsett | |
| 2002/0193151 A1 | 12/2002 | Edreich | |
| 2003/0060241 A1 | 3/2003 | Loprete | |
| 2003/0157973 A1 | 8/2003 | Yang | |
| 2003/0165237 A1 | 9/2003 | Farr et al. | |
| 2004/0077382 A1 | 4/2004 | Verity | |
| 2004/0203521 A1 | 10/2004 | Nassimi | |
| 2004/0204165 A1 | 10/2004 | Huang | |
| 2004/0256188 A1* | 12/2004 | Harcourt | 191/12.2 A |
| 2005/0116684 A1* | 6/2005 | Kim | 320/114 |
| 2005/0255898 A1 | 11/2005 | Huang | |
| 2006/0058081 A1 | 3/2006 | Reichenbach | |
| 2006/0287006 A1 | 12/2006 | McIntyre et al. | |
| 2007/0165371 A1 | 7/2007 | Brandenburg | |
| 2007/0293288 A1 | 12/2007 | Lin et al. | |
| 2008/0009329 A1 | 1/2008 | Adler | |
| 2008/0053852 A1 | 3/2008 | Ko et al. | |
| 2008/0232089 A1 | 9/2008 | Riccardi | |
| 2009/0186264 A1 | 7/2009 | Huang | |
| 2010/0200456 A1 | 8/2010 | Parkinson | |
| 2011/0130174 A1 | 6/2011 | Kroupa | |
| 2011/0203954 A1* | 8/2011 | Kroupa | 206/320 |
| 2011/0233078 A1* | 9/2011 | Monaco et al. | 206/223 |
| 2012/0153065 A1 | 6/2012 | Fischer | |
| 2012/0314351 A1 | 12/2012 | Kroupa | |
| 2013/0029725 A1* | 1/2013 | Heil-Brice et al. | 455/557 |
| 2013/0083456 A1* | 4/2013 | Koenig et al. | 361/679.01 |
| 2013/0188820 A1* | 7/2013 | McLaughlin | 381/384 |
| 2013/0208937 A1 | 8/2013 | Stern et al. | |
| 2013/0237290 A1 | 9/2013 | Simmons et al. | |

* cited by examiner

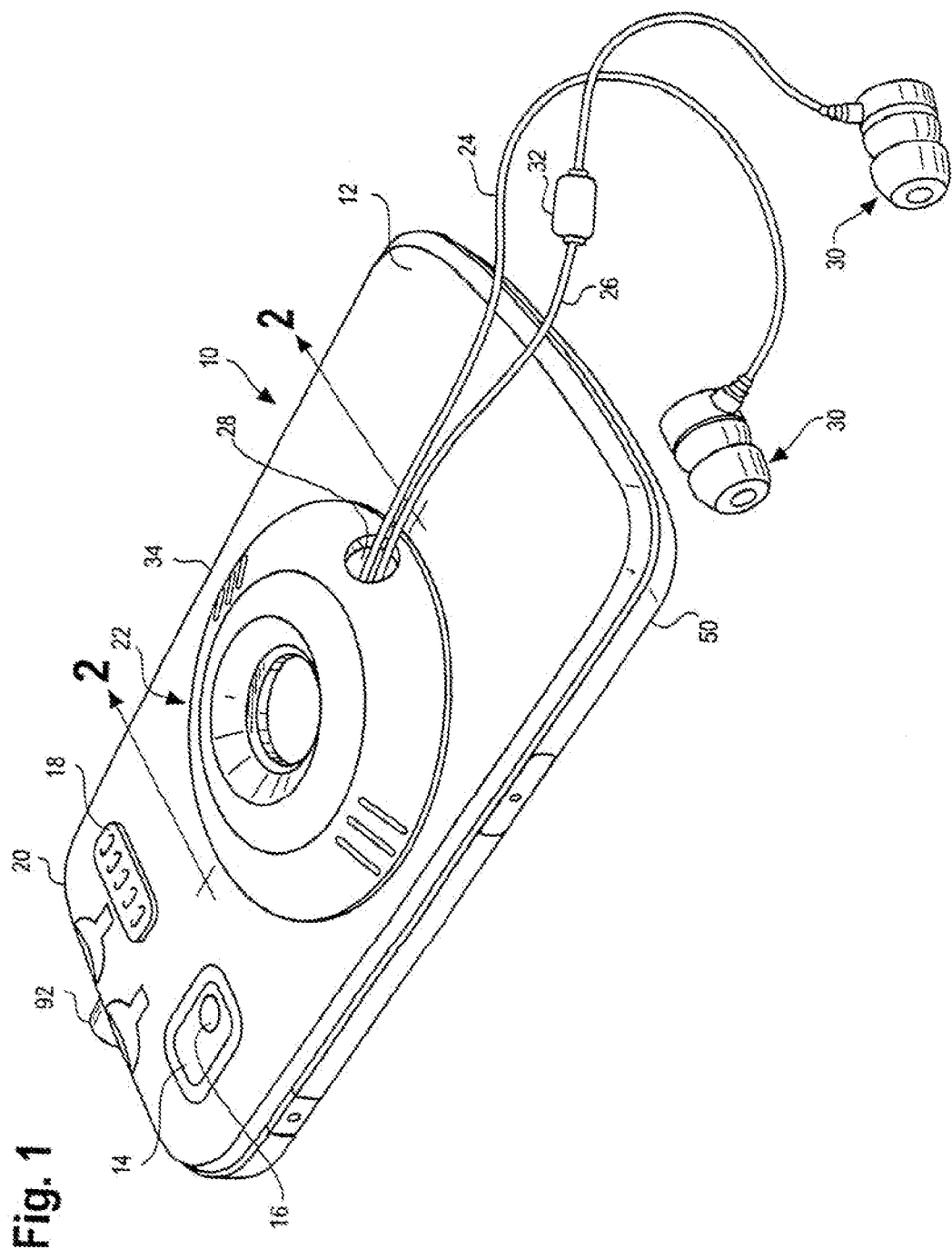

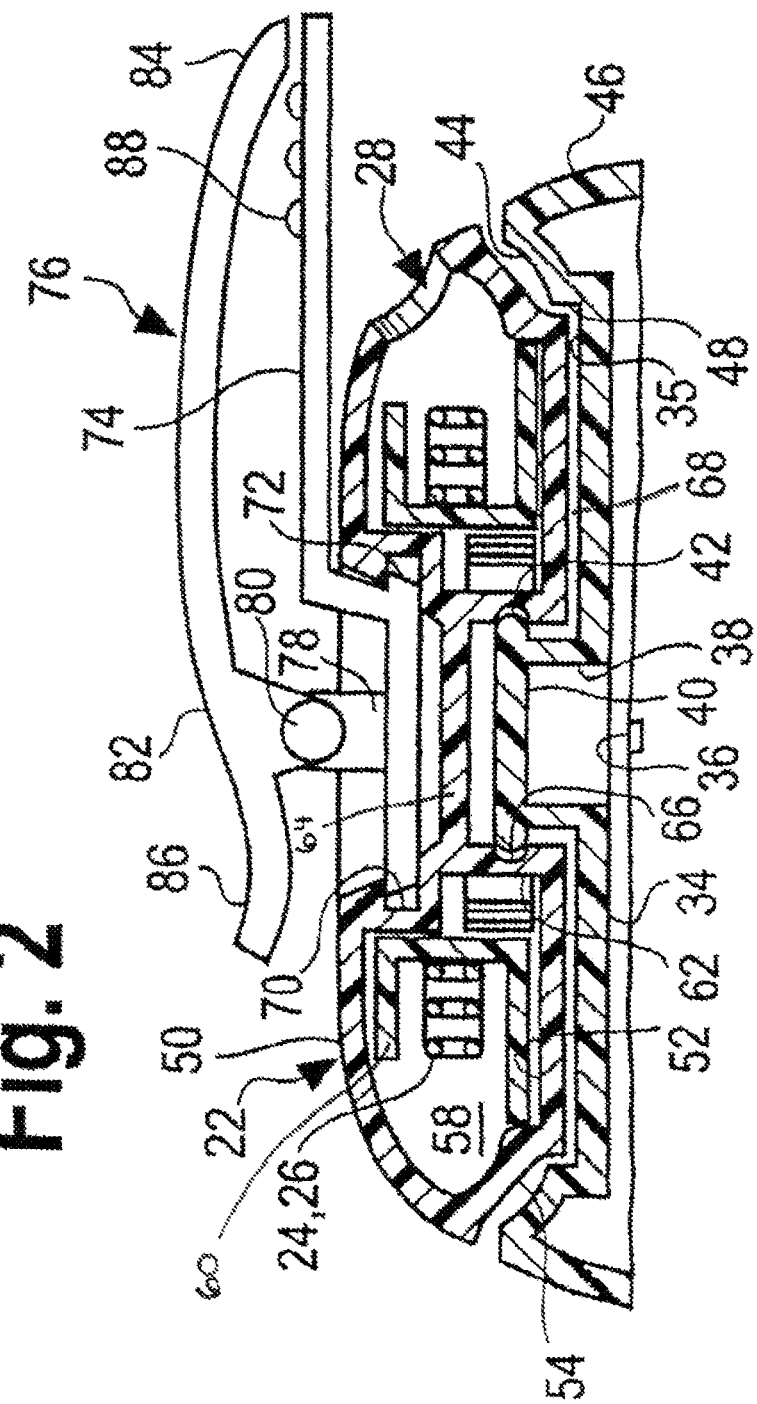

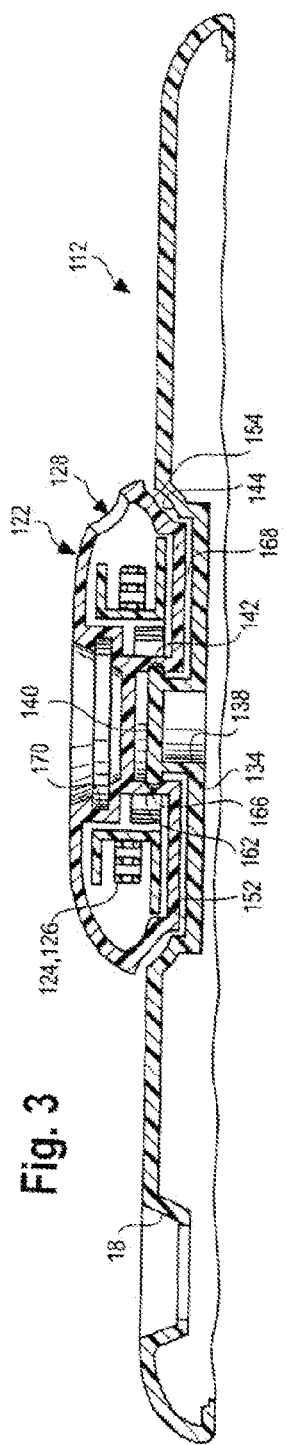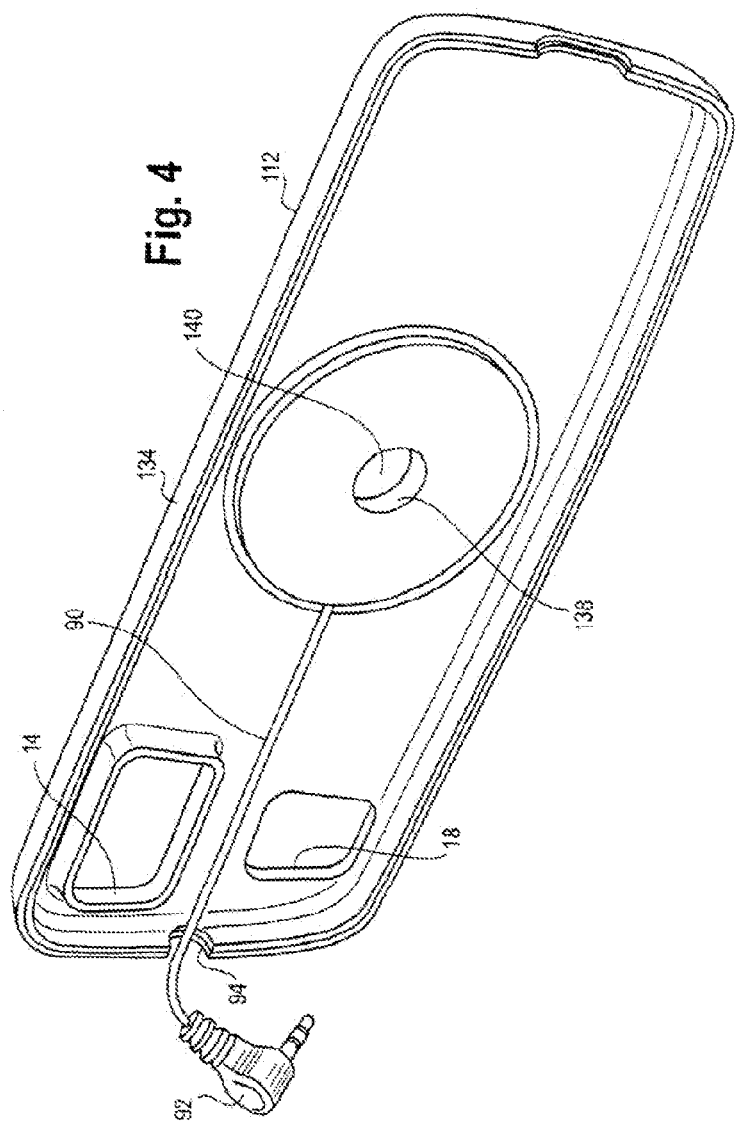

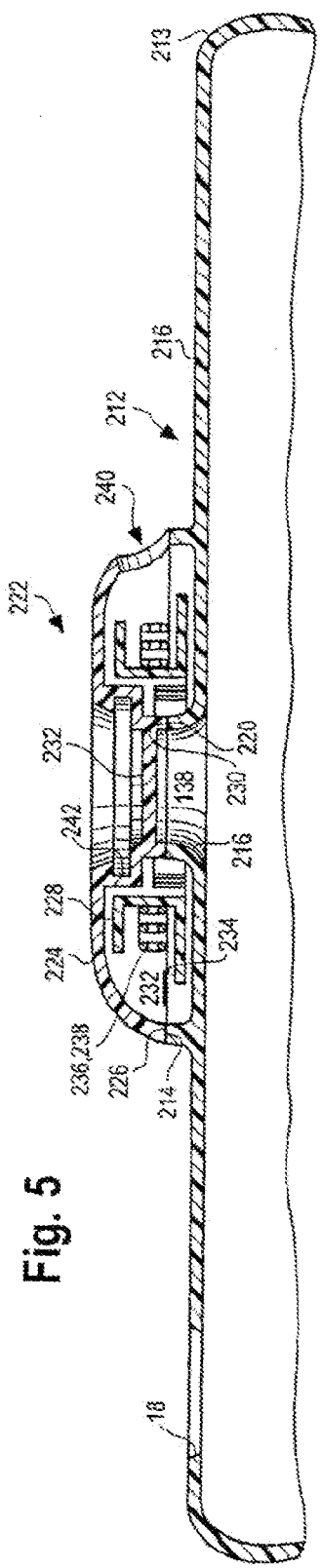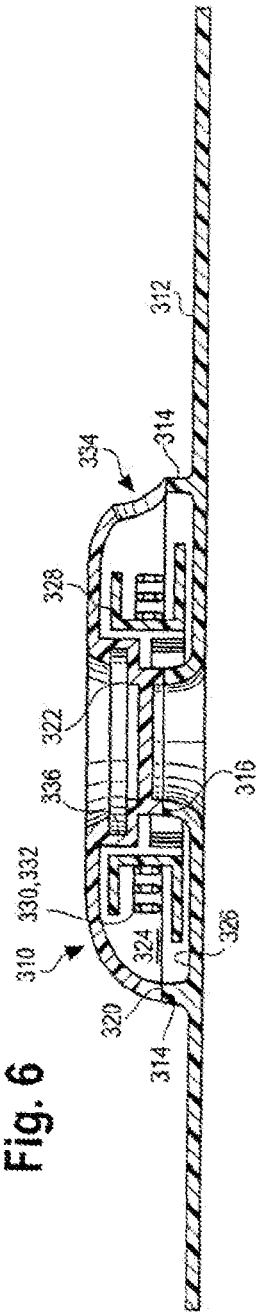

ATTACHABLE EXTENDABLE AND RETRACTABLE EARPIECE CABLE ASSEMBLY FOR MOBILE COMMUNICATION AND SOUND DEVICES

This application claims priority to and is a continuation of non-provisional patent application Ser. No. 13/157,169 filed Jun. 9, 2011 to the extent allowed by law.

BACKGROUND OF THE INVENTION

1. Field of the Invention

The present invention relates generally to extendable and retractable earpieces for mobile electronic devices, such as mobile sound and communication devices, and more particularly to embodiments of an extendable and retractable earpiece assembly that is removably attached to the mobile electronic device in certain embodiments, and is permanently attached to a casing for the mobile electronic device in another embodiment.

2. Description of the State of the Art

Portable sound and communication electronic devices deliver sound waves through either a built in speaker unit or a pair of earpieces or an audio headset adapted to be electrically connected to and removed from the device. While a speaker is a practical feature for a portable communication device, portable sound systems designed to deliver a user's musical selections over a period of time generally require connection of a headset's earpieces, or earpieces per se, to the portable device through a plurality of cables, or a single cable, to convey the sound to the user in private, and without disturbing those near the user. Also, many portable electronic communication devices that have a built-in speaker system also have an audio output port or socket for receiving an earpiece connection jack plug, where the jack plug is normally attached to a cable or cables.

Currently, most if not all portable sound devices, and many portable communication devices, are used with headsets or earpieces attached to wires or cables. For example, portable communication device users rely on headsets or earpieces for convenience in multi-tasking. Such headsets and earpieces, and associated wires and cables, however, when not in use, extend and freely dangle from the mobile device and the earpieces or headset, allowing the wires, headset and/or earpieces to become ensnared on a nearby object, such as the user's clothing, and to rip out of the device causing damage to the headset or earpieces and wires, or both. Replacement of such damaged parts can be costly.

Additionally, most users of portable electronic sound and communication devices are required to carry at least three separate pieces: a carrying case, a headset or earpieces, and the sound or communication device. Locating and carrying three separate pieces is often frustrating and time consuming. Additionally, certain scientific studies have suggested that the extended use of cell phone or blue tooth wireless headset devices, when the cell phone or blue tooth wireless headset device is placed directly adjacent to one's ear, can result in undesirable health problems, such as tumors and cancer, not the least of which is known as cell phone elbow. Some users of blue tooth wireless headset devices or cell phones in close proximity to the ear have also reported increased headaches.

Presently available recharging units and carrying cases for portable sound and communication devices include assemblies to hold earpiece cables around a spool attached to the carrying case or recharging unit. See, for example, U.S. Patent Publications No. 2005/0116684; 2005/0255898; and 2007/0293288. The prior art also includes stand alone headset cable reel assemblies that attach to the cable itself. These devices add yet another separate component for a user of a portable sound or communication device to deal with. For example, see Patent Publication No. 2001/0035242.

None of the aforesaid prior mobile electronic devices provide a combined integral extendable and retractable earpiece cable reel assembly that removably attaches to the battery access door or panel of a mobile sound device, or is integrally formed as part of a removable casing for a portable sound or communication device, or integrally formed as part of the battery access door or panel of the mobile electronic device.

SUMMARY OF THE INVENTION

The present invention, in one embodiment, provides a holder partially formed as an earpiece cable reel mount, where the holder is permanently affixed to the battery access door of a mobile communications device. Alternately, the holder and reel mount may be permanently affixed to a surface of the mobile communication device housing, the surface located opposite the display screen. In each of these embodiments, a cable reel housing is nested in a cavity formed in the holder, and the cable reel housing is removably attached to the reel mount such as through a snap-fit or other attachment device. A clasp assembly for attaching the mobile communication device to wearing apparel, a back pack, or the like, supported by the user is removably attached to the cable reel housing.

In an additional embodiment, the holder and cable reel mount are integrally formed with the battery access door or panel. The battery access door can cover the entire rear of the mobile communications or sound device, or comprise a panel that covers only a portion of the rear of the device. A cable reel housing is removably attached to the integrally formed reel mount, by means of a snap-fit connection or other suitable connecting means. An attachment clasp is also removably attached to the cable reel housing, such as by a snap-fit connection, or other connection as is known in the art.

In a further embodiment of the present invention, an earpiece or headset cable reel housing forms part of a protective casing or "skin" accessory that extends tightly around the outer body of the mobile communication or sound device, with apertures in the casing allowing the user to freely access the controls, inputs, outputs and displays of the mobile communication or sound device. The protective casing is made of rubber or plastic, and maintains the integrity of the device if the device is accidentally dropped or flung against a hard surface by absorbing and dissipating potentially disabling shock forces before they reach the mobile device. In this embodiment of the present invention, the cable reel housing has a housing base portion integrally formed as part of the casing itself, and a housing cover portion adapted to form a chamber or cavity between the housing base portion and the housing cover portion, where the cable reel is rotatably mounted in the chamber or cavity. An attachment clasp is removably attached to the housing cover portion to attach the mobile device to the clothing or other item supported by the user.

In an additional embodiment of the present invention, the earpiece or headset cable reel housing forms part of the battery access door or panel itself of the mobile electronic device.

BRIEF DESCRIPTION OF THE DRAWINGS

The following figures are included to better illustrate the embodiments of the devices and techniques of the present invention. In these figures, like numerals represent like features in the several views. It is to be noted that these figures, illustrating the several views of the present invention, unless stated to be otherwise, are not necessarily drawn to scale. Nor are the contents of the drawings to be considered as limiting the scope of the present invention as defined in the claims.

FIG. 1 is a perspective rear view of an embodiment of a mobile electronic communication or sound device, where the earpiece or headset cable reel housing and mount is attached to the battery access door of the mobile device;

FIG. 2 is a cross-section view of the mobile device of FIG. 1, taken along line 2-2 of FIG. 1 also showing the attachment clasp removably fastened to the cable reel housing;

FIG. 3 is a cross-section view of another embodiment of the present invention, where the mount for the removable earpiece or headset cable reel housing is integrally formed as part of the battery access door or panel of a mobile communications or sound device;

FIG. 4 is a bottom perspective view of the battery access door of the embodiment of the invention shown in FIG. 3, also illustrating the jack plug and cable extending from the cable reel housing to an outer edge of the battery access door:

FIG. 5 is a cross-section view of a further embodiment of the present invention where the mobile electronic communication or sound device is covered by a protective casing, and the cable reel housing is formed as a portion of the protective casing; and FIG. 6 is a cross-section view of a further embodiment of the present invention where the cable reel housing is integrally formed with the battery access door or panel.

The illustrated embodiments of the present invention are ancillary to the mobile communication and sound device and earpiece cable reel housing combinations described and claimed in the inventor's co-pending patent application Ser. No. 12/629,220, filed Dec. 2, 2009, titled "Attachable Extendable and Retractable Earpiece Assembly for Mobile Communication and Sound Devices," and Ser. No. 12/708,695, filed Feb. 10, 2010 and titled "Attachable Extendable and Retractable Earpiece and Protective Casing Assembly for Mobile Communication and Sound Devices." the contents of which applications are incorporated herein by reference.

DETAILED DESCRIPTION OF THE ILLUSTRATED EMBODIMENTS

The present invention, in one embodiment, provides an extendable and retractable earpiece cable or headset assembly in a reel housing, where the reel housing is detachably fastened to a holder, and the holder is permanently fixed to the battery access door or panel of a mobile electronic communication or sound device. Referring to FIGS. 1 and 2, the side of an electronic mobile communications or sound device 10 opposite the display screen (not shown) is illustrated. In the electronic device 10, illustrated in FIG. 1, the battery access door 12 extends along the entire length and width of the rear of device 10, and includes aperture 14 for access to a camera lens 16, and an aperture 18 for access to a speaker 20, for example. In other mobile electronic communication devices (not shown) the battery access panel may extend only over a portion of the rear of device 10. The embodiment of the present invention shown in FIGS. 1 and 2 is also applicable to these devices, as will be explained.

Referring to FIGS. 1 and 2, an earpiece or headset cable reel housing 22 encloses a retractable and self-retracting reel of the type disclosed and illustrated in the inventor's two co-pending applications, Ser. Nos. 12/629,220 and 12/708,695 mentioned above. Earpiece cables 24, 26 extend from the reel located inside housing 22 through aperture 28 in the reel housing. Each cable is attached at its outer end to an earpiece 30 in the illustrated embodiment. The present invention contemplates that the cables 24, 26 could also be attached to speakers embedded in a headset (not shown). If desired, a microphone 32 is connected to one of the cables 24, 26, as is known in the art.

Referring to FIG. 2, one side of a reel housing mount holder 34 is permanently affixed to battery access door 12 by means of an adhesive 36, or other suitable attachment means as are known in the art. Reel housing mount holder 34 includes a mounting post 38 having a radially outwardly extending flange 40 at the top of post 38. In the embodiment illustrated in FIGS. 1 and 2, mounting post 38 is cylindrical in configuration, and flange 40 is circular in configuration. The rim 42 of flange 40 has a curved surface, for purposes to be explained. The outer extent of holder 34 includes an upwardly and outwardly extending support surface 44, and an outer decorative surface 46. The space formed in reel housing mount holder 34 between mounting post 38 and support surface 44 provides a nesting recess 48.

As illustrated in FIG. 2, reel housing 22 is constructed to be readily attached to and removed from mounting post 38 of holder 34. Reel housing 22 comprises an upper surface 50 that is circular in the illustrated embodiment and a lower surface 52, also circular in the illustrated embodiment. The outer edge of upper surface 50 curves downward, and connects to a reel housing support surface 54. Reel housing support surface 54 has a contour that corresponds to the contour of support surface 44 of reel housing mount holder 34, such that when reel housing 22 is attached to mount holder 34 as will be explained, reel housing support surface 54 contacts mount holder support surface 44.

The space between lower surface 52 and upper surface 50 of reel housing 22 defines a chamber or cavity 58 between the upper and lower surfaces 50 of the reel housing. Reel 60 is located in chamber 58, and cables 24, 26 are coiled around reel 60 when the earpieces 30 are not in use. The radially inner portion of reel housing 22 is defined by a wall 62. A flat plate 64 extends across the circular center of reel housing 22 to provide support for and strength to the reel housing.

As viewed in FIG. 2, the lower portion of wall 62 includes a first circumferential slot 66 that is dimensioned to form a releasable snap-fit with curved rim 42 of flange 40 when reel housing 22 is attached to mounting post 38. As shown in FIG. 2, when reel housing 22 is attached to mounting post 38, the lower surface 52 of the reel housing is lodged in the chamber 68 formed between mounting post 38 and support surface 44 of holder 34. Also, reel housing support surface 54 engages support surface 44 of holder 34 to provide support for the reel housing 22.

As also seen in FIG. 2, the upper portion of wall 62 includes a second circumferential slot 70 adapted to receive a flange 72 of the base plate 74 of a clasp assembly 76. The clasp assembly 76, when attached to reel housing 22, provides a means for attaching the mobile electronic communications or sound device 10 and reel housing 22 to an article of clothing or other accessory worn or supported by a user of the mobile communication device 10. Clasp assembly 76 comprises one or two upwardly extending brackets 78 through which a spring loaded pin 80 extends. A clasp arm 82 having a forward portion 84 and a rear portion 86 is attached to brackets 78 and to pin 80, with the forward portion of clasp arm 82 biased towards engagement with base plate 74. A plurality of ribs 88 on base plate 74 enhances the ability of the clasp assembly to firmly engage the wearing apparel or accessory of the user. Applying a manual force to rear portion 86 moves forward portion 84 of clasp arm 82 out of engagement with base plate 74 against the bias of the spring attached to pin 80. Clasp assembly 76 can be removed from reel housing 22 when not needed by disengaging flange 72 form second circumferential slot 70. The embodiment of the invention illustrated in FIGS. 3 and 5 show the clasp assembly removed from slot 70.

Another embodiment of the present invention is illustrated in FIGS. 3 and 4. In the embodiment of FIGS. 3 and 4, the mount holder 134 for the reel housing 122 is formed integrally with the battery access door or panel 112 of the mobile communications device 10 (FIG. 1). In the embodiment illustrated in FIGS. 3 and 4, the battery access door 112 extends the entire length of the rear of the mobile communication device 10. It is also contemplated that in other embodiments of the present invention, battery access door 112 may comprise a panel, and only extend partially along the length or width of the rear of the mobile communication device.

Referring to FIG. 3, the battery access door or panel 112 has a chamber 168 formed as part of the battery access door, which cavity is circular in the illustrated embodiment, chamber 168 has a support surface 144 adapted to contact a corresponding support surface of the detachable reel housing 122, as will be described. Also formed as part of battery access door 112 is an upwardly extending, as viewed in FIG. 3, mounting post 138 with a radially extending flange 140. Flange 140 has a rounded rim 142.

In the embodiment illustrated in FIG. 3, the reel housing 122 is identical to the reel housing 22 of the embodiment shown in FIGS. 1 and 2. The reel housing 122 is adapted to be removably attached to mounting post 138. To this end, the reel housing 122 includes a circular first circumferential slot 166 in a lower portion of wall 162. When reel housing 122 is manually inserted over mounting post 138, the rounded rim 142 of flange 140 extends into slot 166, thus securing reel housing 122 to mounting post 138 and to battery access door 112.

To remove reel housing 122 from battery access door 112, a manual upward force is applied to reel housing 122, and flange 140 becomes disengaged from slot 166, and reel housing 122 is then placed in a storage location for future use.

Reel housing 122 includes lower surface 152 that extends into and is supported by chamber 168 when reel housing 122 is attached to mounting post 138. Reel housing 122 also includes a support surface 154 that engages support surface 144 on the edge of chamber 168 for added support when reel housing 122 is attached to mounting post 138.

An upper portion of wall 162 of reel housing 122 in the embodiment of FIG. 2 includes a second circumferential slot 170 that is adapted to removably receive a flange of a clasp assembly similar to that identified as 76 and 72 in the embodiment of FIG. 2. A reel 160 is located in chamber 158 formed in reel housing 122, and cables 124, 126 are coiled around reel 160 when the earpieces 30 (FIG. 1) are not in use. When withdrawn from or retracted into reel housing 122, cables 124, 126 extend through aperture 128 in the reel housing 122.

FIG. 5 illustrates a further embodiment of the present invention where the earpiece cable reel housing 222 is integrally formed with a rear protective cover, or casing 212 for mobile electronic communications device 10 (FIG. 1). Casing 212 has a downwardly extending curved portion 213 adapted to extend around and engage an electronic mobile communication or sound device 10, as is known in the art.

In today's vernacular, casing 212 is sometimes referred to as a "skin." Casing 212 has an upstanding outer ridge or rim 214 formed on a surface 216 that is circular in the illustrated embodiment. A cutout dimpled portion 218 is also formed on casing surface 216, and forms an inner ridge or rim 220.

A reel housing cover 222 is adapted to be affixed to casing 212. Reel housing cover 222 includes an upper surface 224 that curves outwardly and downwardly in the illustrated embodiment and ends outwardly at a support surface 226. The center portion of reel housing cover 222 comprises a circular wall 228 in the illustrated embodiment, where a lower portion of wall 228 comprises a circular edge surface 230. A circular support plate 232 of reel housing 222 extends across open dimpled portion 218 of casing 212.

Reel housing 222 is permanently mounted to casing 212 by attaching outer support surface 226 of the reel housing 222 to outer rim 214 of casing 212 by adhesive, brazing, clamps or other suitable fastening means as are known in the art. In similar fashion, edge surface 230 of reel housing 222 is attached to inner rim 220 of casing 212 by adhesive, brazing, clamps, or other suitable fastening means as are known in the art.

When reel housing 222 is fixed to casing 212 as described above, and as shown in FIG. 5, a cavity 232 is formed between reel housing cover 222 and surface 216 of casing 212. A reel 234 is rotatably mounted in cavity 232, with earpiece cables 236, 238 coiled around reel 234 as is known in the art. Cables 236, 238 are the same as cables 24, 26 of the embodiment shown in FIGS. 1 and 2. Cables 236, 238 enter and exit cavity 232 through aperture 240 formed in reel housing cover 222 in the same manner as earpiece cables 24, 26 enter and exit cavity 58 of the embodiment shown in FIG. 2. The reel 234 and cables 236, 238 are placed in cavity 232 prior to attaching reel housing cover 222 to casing 212 for manufacturing purposes.

Referring again to FIG. 5, the upper portion of wall 228 of reel housing 222 includes a circumferential slot 242. Slot 242 is adapted to removably receive a flange of a clasp assembly similar to that identified as 76 and 72 in the embodiment of FIG. 2.

Referring to FIG. 4, the underside of the battery access door 112 shown in FIG. 3 is illustrated. A jack plug cable 90 extends from an aperture (not shown) in reel housing 122. The outer end of cable 90 is electrically attached to a jack plug 92 that is adapted to be inserted into the audio output port of mobile communications or sound device 10 (FIG. 1). The inner end of cable 90 is electrically connected to the ends of earpiece or headset cables 124, 126 in reel housing 122, which cables are also attached at their outer ends to earpieces 30, or to an audio headset (not shown). Further details of the electrical connections between cable 90 and cables 124, 126 are described and illustrated in the inventor's co-pending patent applications referred to above.

As seen in FIG. 4, one end of battery access door 112 includes an opening 94 through which jack plug cable 90 extends when the access door is assembled with mobile communication device 10. Jack plug 92 is removed from the audio output port of device 10 prior to disassembling battery access door 112 from mobile communications or sound device 10.

In operation of the embodiment of the invention shown in FIGS. 1 and 2, the mobile communication or sound device 10 has reel housing mounting holder 34 fixed to battery access door or panel 12 with fastening adhesive 36 or other suitable fastening means. To attach earpiece cable reel housing 22 to holder 34, reel housing 22 is placed adjacent chamber 58 and downward manual pressure is applied to reel housing 22 such that the lower portion of wall 62 extends over mounting post 38, and the rim 42 of flange 40 enters slot 66. The present invention contemplates that flange 40 and/or wall 62 are made of a material having at least a slight degree of give, whereby rim 42 of flange 40 and slot 66 provide a releasable snap-fit, releasably holding reel housing 22 to mounting post 38. In this position, lower surface 52 of reel housing 22 is supported by the upper surface 35 of mount holder 34, and reel housing support surface 54 of the reel housing contacts and is supported by support surface 44 of mount holder 34.

In the embodiment illustrated in FIG. 2, flange 72 of clasp assembly 76 is inserted into slot 70 such that the clamp assembly is firmly held to reel housing 22. Manual pressure is applied to rear portion 86 of clasp arm 82, pivoting forward portion 84 of the clasp arm upward. The user then attaches the clasp arm 82, reel housing 22 and mobile communications or sound device 10 to an article of clothing worn by the user, such as a belt or pocket, or to an accessory supported by the user, such as a purse or backpack. Jack plug 92 (FIG. 2) is next inserted into the audio output port of mobile communications device 10 (FIG. 1). The user then grasps earpieces 30 and manually unreels cables 24, 26 from reel 60 through aperture 28 in reel housing 22, and inserts earpieces 30 into the ears. The mobile electronic communications or sound device 10 is then activated.

When the user concludes listening to the audio output of the mobile communications or sound device, the earpieces are removed from the ears, and a gentle tug or tension force is applied to the cables 24, 26. The automatic rewind feature of the reel 60 in reel housing 22, as explained in detail in the inventor's co-pending patent applications mentioned above, rewinds cables 24, 26 back onto reel 60 until earpieces 30 abut the outer surface of the reel housing surrounding aperture 28. Aperture 28 is large enough in diameter to allow cables 24, 26 to freely enter and exit reel housing 22, but small enough to prevent one or both earpieces 30 to enter reel housing 22.

Next, the user unplugs jack plug 92 from the audio output port of device 10. Upward manual pressure is then applied to reel housing 22 to disengage rim 42 of flange 40 from slot 66, thus separating reel housing 22 and clasp assembly 76 from reel housing mount holder 34. If desired, clasp assembly 76 can also be disengaged from reel housing 22 by removing flange 72 from slot 70. The reel housing 22 and clasp assembly 76 may then be stored until the user desires to use the earpieces 30 again.

Referring to the embodiment of the invention shown in FIGS. 3 and 4, the reel housing 122 is inserted over mounting post 138, and downward manual pressure is applied to reel housing 122 until rim 142 of flange 140 enters slot 166 and the bottom surface of reel housing 122 is lodged in chamber 168 and support surface 154 is lodged against support surface 144. The clasp assembly 76 may be attached to reel housing 122, if desired, in the same manner as described above in conjunction with the description of the operation of the embodiment of the invention of FIGS. 1 and 2. The remainder of the operation, cable extension and retraction, and the assembly and disassembly of the reel housing onto and from the battery access door in the embodiment of FIGS. 3 and 4 are also the same as described above regarding the operation of the embodiment of FIGS. 1 and 2.

Referring to FIG. 5, in this embodiment of the invention the cable reel housing cover is permanently attached to casing 212, and the casing 212 is either permanently attached to the mobile communication or sound device 10 (FIG. 1), or attached to the device 10 prior to use. Upon use, the user grasps earpieces 30 by hand, and extends cables 236, 238, out of chamber or cavity 232 through aperture 240 until the earpieces can be comfortably inserted into the user's ears.

The operation of retracting the cables 236, 238 into the reel housing chamber 232 is the same as described above regarding the embodiments shown in FIGS. 1, 2 and 3. Also, if desired, clasp assembly 76 (FIG. 2) can be attached and/or detached from reel housing cover 222 in the same manner as described above regarding FIGS. 1, 2 and 3.

FIG. 6 illustrates an additional embodiment of the present invention where the reel housing 310 is formed integrally with the battery access door or panel 312 of mobile electronic device 10 (FIG. 1). The battery access door 312 includes an upstanding outer ridge or rim 314 formed in the battery access door or panel, and upstanding inner ridge or rim 316 also formed in the battery access door. Reel housing cover 318 has a first support surface 320 that is firmly attached to outer ridge 314 by adhesive, brazing, or other suitable means that are known in the art. Likewise, reel housing cover has a second support surface 322 that is firmly attached to inner ridge 316 of battery access door 312. As seen in FIG. 6, a cavity 324 is formed between the surface 326 of battery access door 312 and reel housing cover 318. A reel 328 is disposed in cavity 324. Reel 328 is similar in construction and operation to the reel 60 of the embodiment of FIG. 2, as described above.

Either a single cable with two electrically conductive wires or two electrically conductive cables 330, 322 are coiled around reel 328 which reel, as described above in conjunction with the embodiments of the invention disclosed in FIGS. 2, 3 and 5, is a self-recoiling reel that allows cables 330, 332 to be withdrawn from cavity 324 through aperture 334 in reel housing cover 318. Upon the application of a gentle tension force on the cables 332, 334 after the cables have been withdrawn from cavity 324 and the user of mobile electronic device 10 (FIG. 1) desires to rewind the cables into cavity 324, the cables 332, 334 are rewound on reel 328.

During the process of manufacturing the embodiment of the present invention shown in FIG. 6, the reel 328 with cables 330, 332 and earpieces 30 (FIG. 1) electrically connected to the cables 330, 332 is placed in cavity 324 before the support surfaces 320, 322 of reel housing cover 318 are affixed to outer ridge 314 and inner ridge 316 of the battery access door.

The embodiment of FIG. 6 also includes a slot 336 for the removable attachment of a clasp assembly similar to clasp assembly 76 illustrated in FIG. 2.

As described above, the embodiment of FIG. 5 shows the housing for the reel 234 integrally formed as part of a protective casing 212 for a mobile electronic device. The embodiment of the invention shown in FIG. 6 shows the housing for the reel integrally formed as part of a surface of a battery access door or panel 312. In other respects, the description above regarding the function of the embodiment of the present invention of FIG. 6 is similar to the function of the embodiment of FIG. 5.

The foregoing descriptions of the illustrated embodiments of the invention have been presented for purposes of illustration and description, and are not intended to be exhaustive or to limit the invention to the precise forms disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:
1. An extendable and retractable earpiece or audio headset cable assembly for mobile electronic communication or sound devices having an audio output port, comprising:
   a laterally extending mount attached to a portion of said mobile electronic communication or sound device; wherein said mount is a battery access door;
   a cable reel housing removably connected to said mount;

said mount including a flange having an outwardly extending rim; said reel housing including a slot, said slot adapted to receive and engage said rim of said flange to removably attach said reel housing to said mount on said mobile electronic communication or sound devices.

2. The cable assembly of claim 1, wherein:

Said mount comprises a mounting post, said flange mounted on said mounting post.

3. The cable assembly of claim 2, wherein:

said rim of said flange is curved, said curved rim adapted to engage said slot when said reel housing is removably attached to said mount.

4. The cable assembly of claim 1, wherein:

a chamber is formed in said reel housing and a rotatable reel is disposed in said chamber;

at least one cable coiled around said reel, said at least one cable extending from said reel in said chamber and through an aperture in the reel housing to a location exterior of said reel housing; and said at least one cable electrically connected at one end to at least one of an earpiece and an audio headset.

5. The cable assembly of claim 4, wherein:

a second end of said at least one cable is electrically connected to an electrical jack plug, said electrical jack plug adapted to be electrically connected to said audio output port of said mobile electronic communication or sound devices.

6. The cable assembly of claim 5, wherein:

said reel allowing said at least one cable to extend outward in a linear direction from said reel housing through said aperture upon the application of a manual tension force to said at least one cable.

7. The cable assembly of claim 6, wherein:

the application of the tension force to the extended at least one cable actuates said reel to rewind said at least one cable around said reel.

8. The cable assembly of claim 6, wherein:

said aperture having a dimension adapted to prevent said earpiece or said headset from passing through said aperture and into said chamber.

9. The cable assembly of claim 1, wherein:

said reel housing includes a second slot, said second slot adapted to receive a flange of a clasp assembly and removably attach said clasp assembly to said reel housing, said clasp assembly adapted to removably attach said reel housing to an item worn or supported by a user of said mobile electronic communication or sound devices.

10. A combination protective apparatus for a mobile electronic device electrically connected to an extendable and retractable earpiece or audio headset cable assembly for said mobile electronic device having input and output ports and at least one electronic screen display, comprising:

a protective casing having certain internal dimensions substantially the same as certain external dimensions of said mobile electronic device, said casing adapted to receive and extend tightly around all peripheral sides of said mobile electronic device and having an aperture for the electronic screen display, said protective casing having an earpiece or headphone cable reel housing formed integrally with said protective casing.

11. The combination protective apparatus and cable assembly of claim 10, wherein:

said protective casing including a surface having inner and outer upwardly extending ridges formed on said surface;

a reel housing cover attached to said inner and outer ridges of said surface, a chamber formed between said reel housing cover and said surface of said protective casing;

a reel disposed in said chamber, at least one electric cable coiled around said reel, said at least one cable extending out of said chamber through an aperture in one of said reel housing cover and said outer upwardly extending ridges;

said at least one electric cable electrically connected at one end to at least one of an earpiece and an audio headset; and said reel adapted to rewind said at least one electric cable around said reel upon the application of a tension force to said at least one electric cable after said at least one cable has been extended through said aperture.

12. The combination protective apparatus and cable assembly of claim 10, wherein:

said cable reel housing includes a slot;

said slot adapted to receive a flange of a clasp assembly and removably attach said clasp assembly to said cable reel housing; and said clasp assembly adapted to removably attach said protective casing to an item supported by a user of the mobile electronic device.

13. An extendable and retractable earpiece or headset cable assembly for mobile electronic communication or sound devices having an audio output port and a battery access door or a panel, comprising:

a cable reel housing integrally formed with an outer surface of one of said battery access door and panel of said mobile electronic communication or sound devices;

a chamber formed in said cable reel housing;

a rotatable reel disposed in said chamber;

at least one cable coiled around said reel, said at least one cable extending from said reel in said chamber and through an aperture in said cable reel housing to a location exterior of said reel housing; and said at least one cable electrically connected at one end to at least one of an earpiece and an audio headset.

* * * * *